(12) United States Patent
Keener et al.

(10) Patent No.: US 6,466,845 B1
(45) Date of Patent: Oct. 15, 2002

(54) METHOD FOR TRACKING CRITICAL VARIABLES

(75) Inventors: Brian T. Keener, Beverly Hills; Harry N Kiafoulis, Commerce Township., both of MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 09/566,164

(22) Filed: May 5, 2000

(51) Int. Cl.[7] .............................................. G01M 1/38
(52) U.S. Cl. ..................... 700/279; 702/113; 33/203.12
(58) Field of Search ........................... 700/279; 702/95, 702/113; 356/155, 139.04, 139.1; 33/203.12–203.21

(56) References Cited

U.S. PATENT DOCUMENTS 5,150,515 A * 9/1992 Merrill et al. ............ 33/203.12
5,583,797 A * 12/1996 Fluegge et al. ............ 700/279
5,812,256 A * 9/1998 Chapin et al. ........... 356/155 X
6,151,562 A * 11/2000 Merrill ........................ 702/95

* cited by examiner

Primary Examiner—Richard Chilcot

(57) ABSTRACT

A method for tracking critical wheel alignment variables begins by assembling a plurality of vehicles and performing a wheel alignment on each of these vehicles. To insure that wheel alignment is being performed properly, approximately two percent the vehicles are audited after production to verify correct wheel alignment. A plurality of significant wheel alignment characteristics for the audited vehicles are automatically collected and transferred to a database. These characteristics are then plotted and reviewed on a weekly basis to identify any negative trends. If a negative trend is identified, then a corrective action to correct this negative trend is implemented.

13 Claims, 1 Drawing Sheet

METHOD FOR TRACKING CRITICAL VARIABLES

TECHNICAL FIELD

The present invention relates generally to automotive assembly methods and, more particularly, to a method for tracking critical wheel alignment variables.

BACKGROUND ART

In order to remain successful, any industry that produces consumer goods must constantly monitor the quality of their products. If the actual or perceived quality of a product is lower than customer expectations, then the customer will find alternative producers of a similar, better quality product. Therefore, it is in the best interest of producers of consumer goods to constantly strive to improve the quality of their products.

Unfortunately, the way in which each consumer perceives quality may vary. Producing a product that fulfills a function without needing repair is only the first step in satisfying today's modern consumer. While designers are successful at making products whose subjective characteristics are perceived by consumers as high quality, it is more difficult to design a product whose objective characteristics are perceived in that same way. For example, the size, weight, or functions of a product are all easily measured and designed into a product; however, the vibrations produced, or color of a product are more subjective. Also, what may seem acceptable to a designer often may not be acceptable to a consumer.

One of these subjective characteristics noticeable to consumers is wheel alignment in an automobile. Wheel alignment is a major source of customer complaints. Unfortunately, prior art solutions have generally relied on manually tracking a limited number of critical characteristics with little success. Vehicle wheel alignment is very important for customer satisfaction. In order to insure proper performance of a vehicle, such as an automobile or truck, various inclination angles, such as toe, camber, caster and kingpin inclination angles are set on the vehicle wheels.

During the process of building a vehicle, a number of vehicles are selected and measured to determine the performance of the plant at aligning the vehicle wheels. Hundreds of characteristics relating to wheel alignment may be measured. Unfortunately, an individual operator can only track, chart and maintain a limited number of these characteristics.

In the past, an operator would audit the wheel alignment on approximately 1.9 percent of the vehicles produced by an assembly plant. The operator would then write down the data from each vehicle audited and plot the data on a wall chart and continuously calculate process capability parameters.

The operator only has time to track a limited number of critical wheel alignment variables. This results in a large amount of variation in some parameters of the process.

The disadvantages associated with conventional characteristic tracking techniques have made it apparent that a new technique for tracking critical wheel alignment variables is needed. The new technique should be able to automatically detect wheel alignment characteristics without significant labor involvement. The new technique should also automatically track all available critical wheel alignment characteristics.

SUMMARY OF THE INVENTION

It is an object of the invention to provide an improved and reliable means for tracking critical wheel alignment variables. Another object of the invention is to automatically detect wheel alignment characteristics without significant labor involvement.

In accordance with the objects of this invention, an improved method for tracking critical wheel alignment variables is provided. In one aspect of the invention, a method for tracking critical wheel alignment variables begins by assembling a plurality of vehicles and performing a wheel alignment on each of these vehicles. To insure that wheel alignment is being performed properly, approximately two percent the vehicles are audited after production to verify correct wheel alignment. A plurality of significant wheel alignment characteristics for the audited vehicles are automatically collected and transferred to a database. These characteristics are then automatically plotted and reviewed on a real time basis to identify any negative trends. If a negative trend is identified, then a corrective action to correct this negative trend is implemented.

The present invention achieves an improved and reliable means for tracking critical wheel alignment variables. Also, the present invention is advantageous in that it automatically tracks all available critical wheel alignment characteristics.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
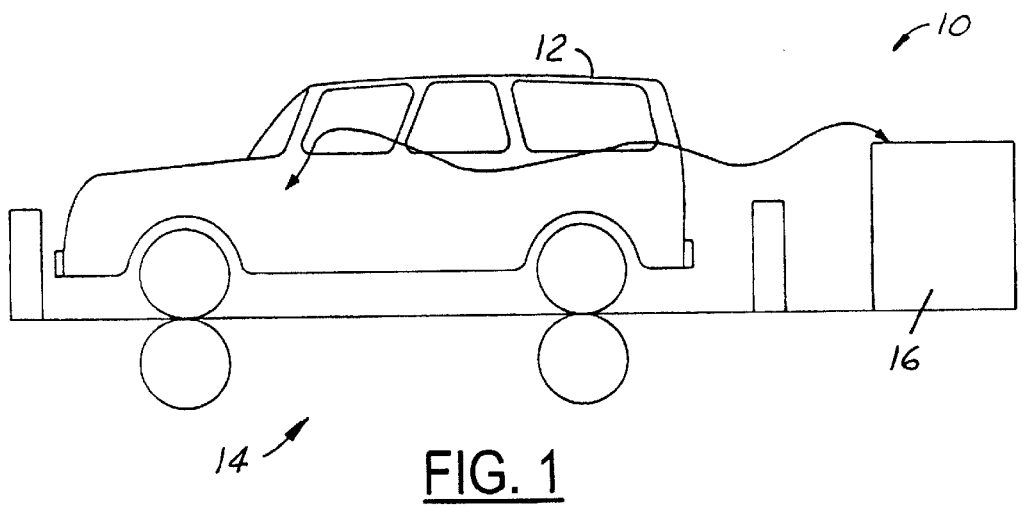
FIG. 1 is a depiction of a system for wheel alignment according to one embodiment of the present invention.

In the following figures, the same reference numerals will be used to identify identical components in the various views. The present invention is illustrated with respect to tracking critical variables, particularly suited for the automotive field. However, the present invention is applicable to various other uses that may require tracking critical variables.

Referring to FIG. 1, a system for wheel alignment during an assembly process 10 according to one embodiment of the present invention is illustrated. System 10 includes a vehicle 12 located in a wheel alignment audit machine 14. Wheel alignment station 14 is coupled to a computer system 18. Computer system 16 includes a database.

In one aspect of the present invention, a wheel alignment audit machine 14 measures hundreds of wheel alignment characteristics of approximately two-percent of the vehicles 12 produced by an assembly plant. Every critical variable, in this case 115 significant characteristics, is then stored in a database located in computer system 16. One skilled in the art would recognize that the present invention may be extended to incorporate any number of significant characteristics. The data is then processed to determine any characteristic trends. This results in being able to track all 115 significant characteristics. If any trends are determined they can be corrected before going out of control and having a significant impact on production. After converting to this system, vehicle wheel alignment warranty was reduced through improved control.

Figure 2:
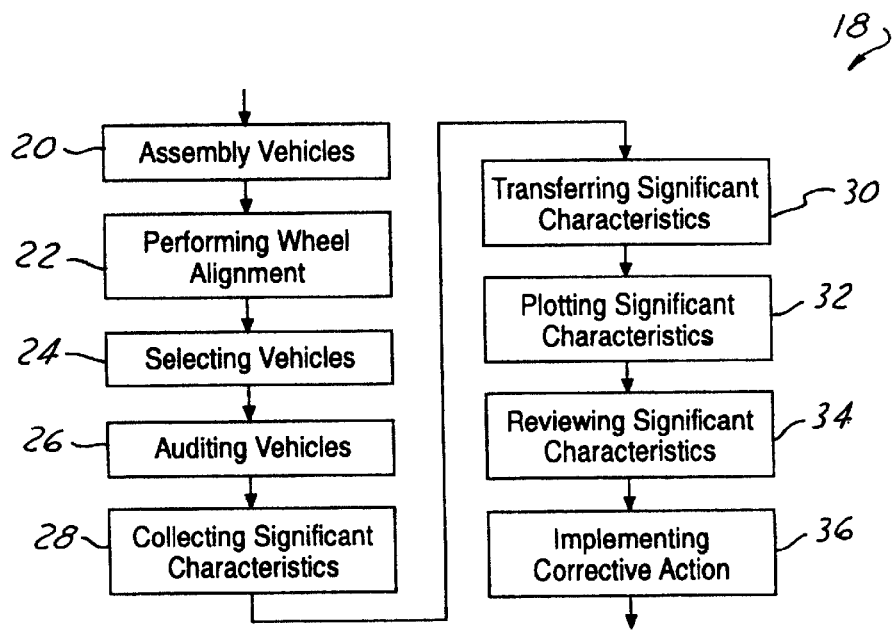
FIG. 2 is a block diagram of a method for tracking critical wheel alignment variables according to one embodiment of the present invention.

Referring to FIG. 2, a block diagram of a method 18 for tracking critical wheel alignment variables according to one embodiment of the present invention is illustrated. In operation, the sequence begins with step 20 by producing a plurality of consumer products. In the present invention, method 18 begins by assembling a plurality of vehicles.

The sequence then proceeds to step 22. In step 22, each consumer products is processed to bring an aspect of the consumer product to within an acceptable range of settings. A plurality of significant characteristics may be measured to determine the correct setting of the aspect of the consumer product. In the present invention, a wheel alignment is performed on each vehicle. A plurality of significant characteristic may be measured to determine proper wheel alignment. The present invention uses 115 significant characteristics, including toe, camber, caster, ride height, and kingpin inclination angles.

The sequence then proceeds to step 24. To insure that the assembly process is adjusting the aspect of the consumer product properly, a sample of the consumer products is selected and audited. In the present invention, approximately 2.0–2.5 percent of the assembled vehicles, approximately twenty-five vehicles per day, is selected. Once these vehicles are selected, the sequence proceeds to step 26 where they are audited. Each consumer product, or vehicle, is audited to verify that the aspect is within an acceptable range of settings. In the present invention, the wheel alignment of each sampled vehicle is verified for correctness.

The sequence then proceeds to step 28. In step 28, the plurality of significant characteristics that determine proper wheel alignment is automatically collected using computer system 16.

These significant characteristics are then transferred into a database in step 30. In step 32, the significant characteristics are tracked and plotted to generate a graph.

The sequence the proceeds to step 34. In step 34 the graph of each significant characteristic is reviewed on a monthly, weekly, or daily basis to identify any negative trends in the significant characteristics. If any negative trends are identified, then the sequence proceeds to step 36 where a corrective action is implemented to correct any negative trends in the significant characteristics.

The method and system of the present invention automatically detects wheel alignment characteristics without significant labor involvement. The present invention also automatically tracks all available critical wheel alignment characteristics so that negative trends may be corrected.

From the foregoing, it can be seen that there has been brought to the art a new and improved method for tracking critical wheel alignment variables. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A method for tracking critical wheel alignment variables comprising the steps of:

producing a plurality of consumer products;

processing each of said plurality of consumer products, whereby an aspect of each of said plurality of consumer products is adjusted to within an acceptable range of settings, said aspect having a plurality of significant characteristics;

selecting a sample of said plurality of consumer products;

auditing said sample to verify that said aspect is within an acceptable range of settings;

collecting said plurality of significant characteristics for said sample using an automated computer system;

transferring said plurality of significant characteristics, using an automated computer system, to a database;

plotting said plurality of significant characteristics for said sample using an automated computer system to generate a graph; and tracking said plurality of significant characteristics over a time period.

2. The method for tracking critical wheel alignment variables as recited in claim 1, wherein said consumer products are vehicles.

3. The method for tracking critical wheel alignment variables as recited in claim 2, wherein the step of producing a plurality of consumer products comprises assembling a plurality of vehicles.

4. The method for tracking critical wheel alignment variables as recited in claim 1, wherein said aspect is wheel alignment.

5. The method for tracking critical wheel alignment variables as recited in claim 4, wherein the step of processing each of said plurality of consumer products comprises performing wheel alignment on a plurality of vehicles.

6. The method for tracking critical wheel alignment variables as recited in claim 1, wherein said sample is approximately two percent of said plurality of vehicles.

7. The method for tracking critical wheel alignment variables as recited in claim 6, wherein the sample is approximately fifty vehicles per day.

8. The method for tracking critical wheel alignment variables as recited in claim 1, wherein said time period is approximately one week.

9. The method for tracking critical wheel alignment variables as recited in claim 1, further comprising the step of reviewing said graph to identify trends in said significant characteristics.

10. The method for tracking critical wheel alignment variables as recited in claim 9, further comprising the step of implementing a corrective action to correct any trends in said significant characteristics.

11. The method for tracking critical wheel alignment variables as recited in claim 9, wherein the step of reviewing said graph to identify trends in said significant characteristics comprises reviewing said graph on a weekly basis.

12. The method for tracking critical wheel alignment variables as recited in claim 9, wherein the step of reviewing said graph to identify trends in said significant characteristics comprises reviewing said graph on a daily basis.

13. A method for tracking critical wheel alignment variables comprising the steps of:

assembling a plurality of vehicles;

performing wheel alignment on each of said plurality of vehicles, whereby a wheel alignment of each of said plurality of vehicles is adjusted to within an acceptable range of alignment, said wheel alignment having a plurality of significant characteristics;

selecting approximately two percent of said plurality of vehicles;

auditing said two percent to verify that said wheel alignment is acceptable;

collecting said plurality of significant characteristics for said two percent using an automated computer system;

transferring said plurality of significant characteristics, using an automated computer system, to a database;

plotting said plurality of significant characteristics for said two percent using an automated computer system to generate a graph;

reviewing said graph on a weekly basis to identify trends in said significant characteristics; and implementing a corrective action to correct any trends in said significant characteristics.

* * * * *